Figure 1:
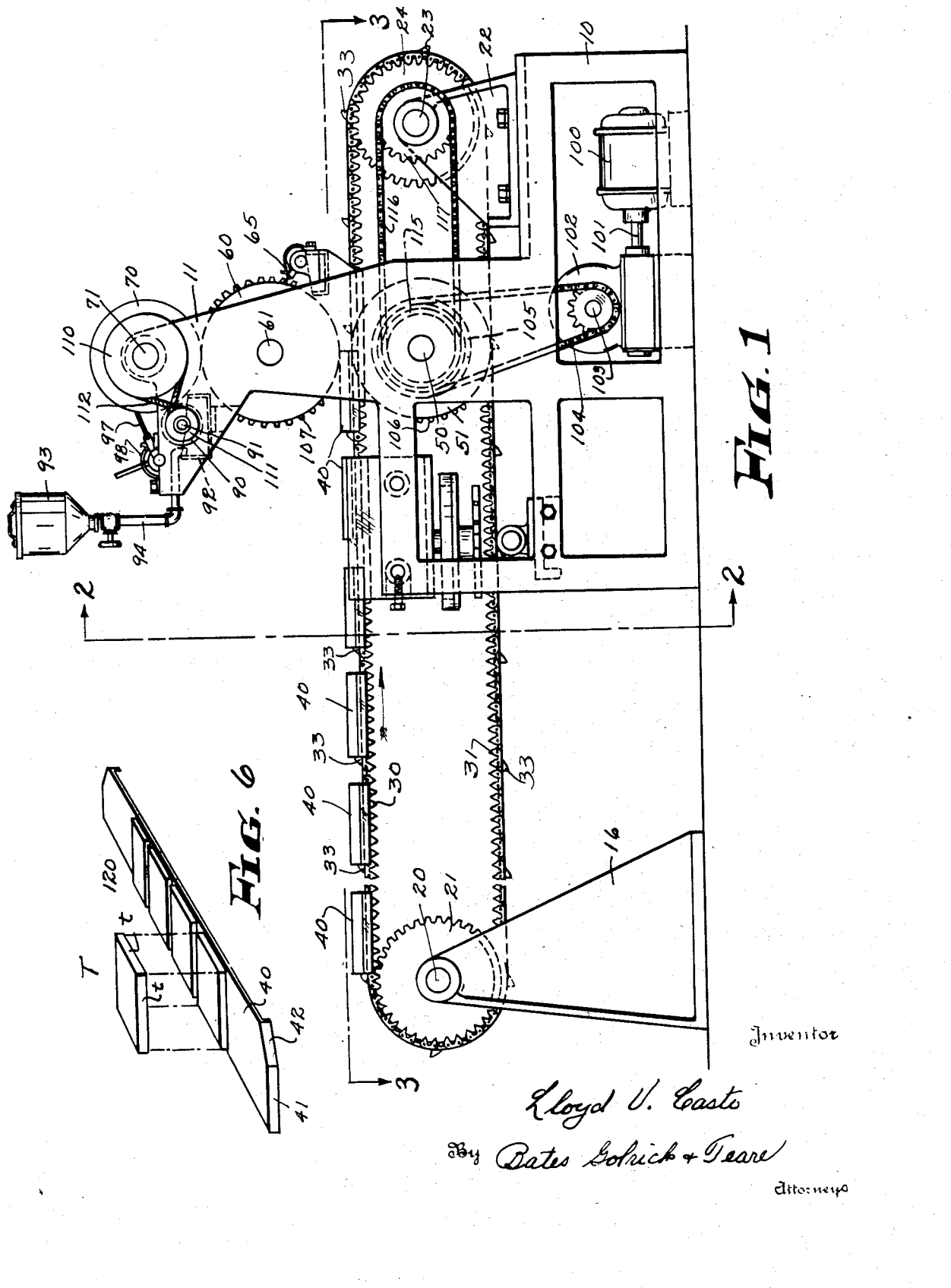

July 10, 1934.   L. V. CASTO   1,965,573
METHOD OF DECORATING TILE AND SIMILAR ARTICLES
Filed Oct. 28, 1932   3 Sheets-Sheet 2

Inventor
Lloyd V Casto
By Bates, Goldrick & Teare
Attorneys

July 10, 1934.  L. V. CASTO  1,965,573
METHOD OF DECORATING TILE AND SIMILAR ARTICLES
Filed Oct. 28, 1932   3 Sheets-Sheet 3

Inventor
Lloyd V. Casto
By Bates, Golrick & Teare
Attorneys

Patented July 10, 1934

1,965,573

UNITED STATES PATENT OFFICE 1,965,573

METHOD OF DECORATING TILE AND SIMILAR ARTICLES

Lloyd V. Casto, Detroit, Mich., assignor to Oxford Varnish Corporation, Detroit, Mich., a corporation of Michigan Application October 28, 1932, Serial No. 639,971

8 Claims. (Cl. 101—170)

The general object of the present invention is the provision of a novel method of deriving a great variety of individual tile decorations or tile prints for tile having either clay bodies or metallic bodies, and particularly adaptable to the manufacture of so-called "Faience tile".

Other objects of my invention will hereinafter become apparent from the description which refers to the accompanying drawings, and the essential characteristics are summarized in the claims.

My invention contemplates the use of an intaglio plate or roll which may be either photographically derived or derived from films or plates having designs effected thereon which have been manually produced, depending upon the particular design which it is desired to obtain. I will describe an example of a method which may be pursued.

If it is desired to obtain tile with so-called "Faience effect", that is, all tile of the same general color decoration, but no two tiles with the same design, I proceed by treating a transparent film or plate by either manually brushing the plate or by use of an air brush to produce variations throughout the plate or film surface and by graduating the density of the pigment or opaque solutions being used, in order to obtain variations in the color density, and incidentally variation in the degree of light which can eventually pass through the film or plate, I may then duplicate this film or plate by the use of a photographic plate or film exposed to light through the aforesaid plate or film, or I may produce a second plate or film in the manual manner described without any effort to follow the general variations of the design of the first-mentioned plate. I then derive an intaglio plate or photogravure plate in the usual manner by the use of carbon tissue exposure and Rembrandt screen and thereafter an etching operation. If a two-color tile is to be produced, only one such intaglio plate or roll is used. If a two-color tile design, such as a Faience design, is desired, a second intaglio plate or roll is produced from the second mentioned plate or film.

I carry out the foregoing steps of deriving intaglio plates by providing or obtaining on the original plate or film an area which is many times larger than the plate area of any of the individual tiles to be produced, and I control the density of the pigment applied to the plate or film in such manner as to get a plurality of gradations from light to dark tones over the entire face of the plate or film. The general area of these gradations from light to dark being larger than the area of an individual tile to be decorated. Hence, when an intaglio plate is derived, as from the original plate or film, the intaglio plate will be etched with a multiplicity of deep pocket areas and shallow pocket areas, each of which areas is greater than the individual tile areas. The application of the ink to the plate is effected in the usual way, by the use of a doctor blade, and thereafter a gum transfer roll is used having an area which is greater than several of the individual tiles to be decorated.

The use of the transfer roll is controlled either manually or by apparatus to be hereinafter described, in such manner that a number of tile are printed in one transfer operation and in each subsequent use of the transfer roll the application of the roll to the intaglio plate is done along different lines of the plate, or the transfer roll may always take the identical design area from the plate if the application of the rolls and the tile surface vary, whereby, for all practical purposes, no two tiles shall have the same design. Should the two-color decorative effect be desired, a second intaglio plate is then used, with a different color, preferably darker than the first color, and the variation of transfer is effected in the manner above described.

It will be apparent that by relative shifting of the roll surface to the tile unit, either manually or by apparatus, and by variation of the two-color application, a practically unlimited variation of the design to individual tiles can be effected.

In the drawings I show an apparatus which is adapted to automatically effect variations in the application of the design on the intaglio plate or roll to a large number of individual tile whereby no two tiles will carry the same design but all tiles will have the same general color effect when assembled in a new structure, such apparatus being the subject matter of my copending application for Letters Patent filed October 3, 1933, and assigned Serial No. 691,959.

Figure 2:
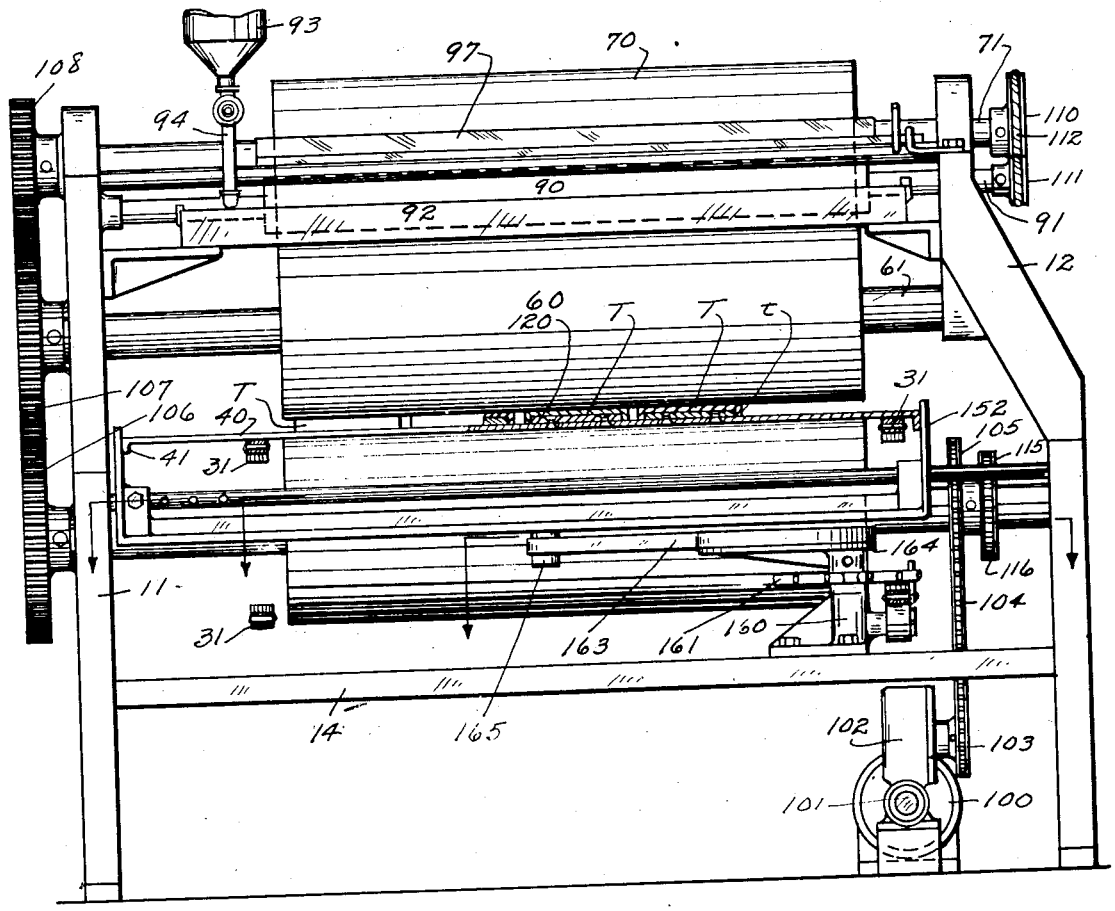
Figure 4:
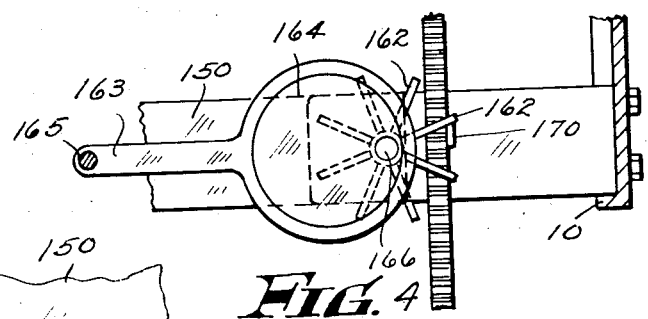
Figure 5:
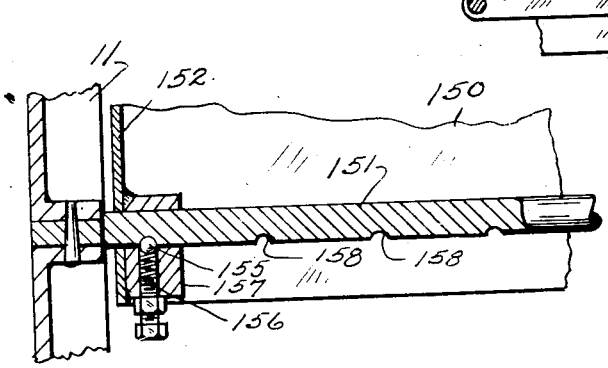
Figure 3:
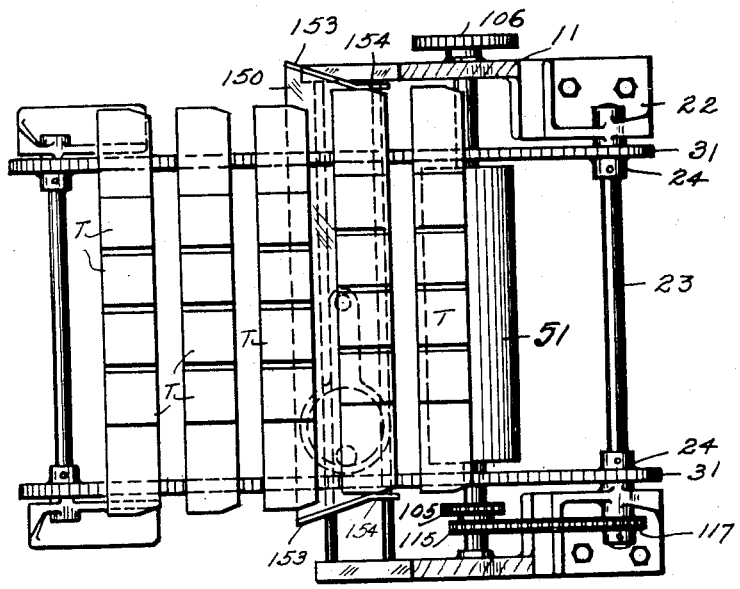
Figure 7:
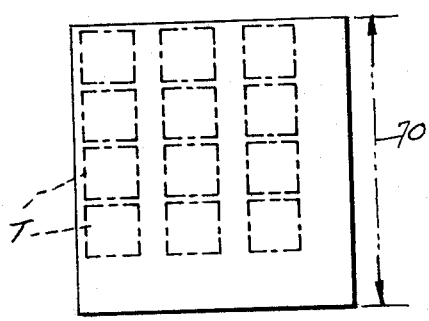
Figure 8:
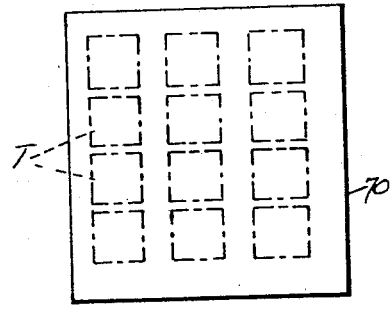
Figure 9:
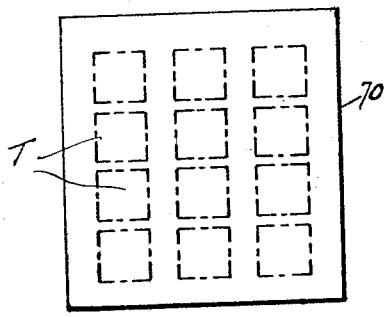
Figure 10:
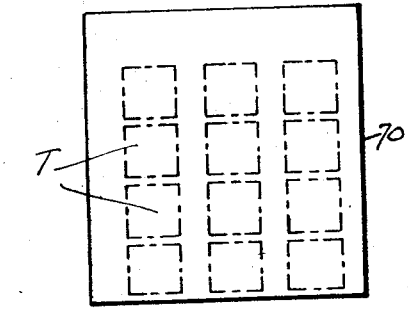

Referring to the drawings, which illustrate a preferred form of apparatus for carrying out my improved method, Fig. 1 is a side elevation of one form of apparatus; Fig. 2 is a transverse section, as indicated by the line 2—2 on Fig. 1; Fig. 3 is a fragmentary longitudinal section as indicated by the line 3—3 on Fig. 1; Figs. 4 and 5 are detailed sections, as indicated by the lines 4—4 and 5—5, respectively, on Fig. 2; Fig. 6 is a perspective of the workholder and illustrates the manner of positioning the work thereon; Figs. 7, 8, 9 and 10 are diagrams illustrating various relative positions between the pattern roll and a number of the tile units.

My preferred form of apparatus comprises a main frame 10, which includes upright side frame members 11 and 12, suitably connected by cross-frame members 15, together with a bearing bracket 16, the latter being mounted on the machine supporting surface, independent of the main frame.

The work is fed to the machine on a conveyor 30. As shown, this conveyor is of the chain belt type, and is carried by two pairs of sprockets 21 and 24, which are secured to shafts 20 and 23, respectively. The shaft 20 is rotatively journalled in the bearing bracket 16 forwardly of the machine frame, while the shaft 23 is rotatively journalled in bearings 22 supported on the rear portion of the frame 10, so that the stretches 30 and 31 of the chain are substantially horizontal.

The impressions are made on the work through the medium of a series of rolls carried by respective shafts which are rotatively journaled in the frame and are in vertical alignment with each other. The lowermost shaft 50 supports a platen roll 51, the uppermost surface of which is tangentially arranged relative to the lower surfaces of work-supporting members 40, which are progressively carried by the feeding chain 30. A shaft 61 lies immediately above and in alignment with the shaft 50. An offset roll 60 is rigidly secured to the shaft 61 and so arranged that its lowermost surface is tangent to the uppermost surface of the pieces of work D carried by the work-supporting member 40.

The designs to be impressed on the work are transferred to the offset roll in the usual manner through the medium of a pattern roll 70. The pattern roll is rigidly mounted on the shaft 71 and has mounted on its periphery an etched plate of the type heretofore mentioned.

The pigments are supplied to the pattern roll through the medium of a feed roller 90 carried by a shaft 91, rotatably mounted in the upper arms of the frame members 10 and 11. The feed roll normally rotates in a trough 92 which is supplied with pigment from a suitable reservoir 93 from which the pigments are fed by gravity through conduits 94 into the trough.

The excess pigment on the pattern roll is removed by a doctor blade 97 which is resiliently held in contact with the pattern roll 70 by suitable spring members 98. After the impression has been made the excess pigment remaining on the offset roll is removed by a scraper blade 65. Hence, the roll, upon contacting with the pattern roll 70, may receive a substantially continuous pattern without being affected by surplus pigment remaining on the roll after the impressions have been made.

The conveyor 30 is driven, in synchronism with the various rolls which serve to make an impression on the work. As shown, a motor 100 is mounted in the base of the frame, and its armature shaft is connected to a gear reduction unit 102, the driven shaft of which is provided with a sprocket 103, which, through the medium of a chain 104 and a socket 105, rigidly mounted on the platen roll shaft 50, serves to drive the last-named shaft. A sprocket 115 is secured to the shaft 50, and through a chain 116, drives a socket 117, which, in turn, is rigidly secured to the rearmost sprocket shaft 23, thereby driving the feed chain in synchronism with the platen roll.

The offset roll 60 is directly geared to the pattern roll 70 and to the platen roll 51. As shown in the drawings, a gear 106 is rigidly secured to the platen roll shaft 50 and meshes with a gear 107 rigidly secured to the offset roll shaft 61, which, in turn, meshes with the gear 108, rigidly secured to the platen roll shaft 71. The offset roll and the platen roll are preferably of the same size as are the gears 106 and 107, so that these two rolls will be driven in absolute synchronism with the movement of the belt, thereby preventing any slipping between the rolls and the work and eliminating blurring of the impression.

The mechanism thus far described is common to various printing machines, which have been used in the past. However, I have arranged the mechanism so that my improved methods may readily be carried out in as simple a machine as is practical. To this end I have provided the chain with lugs 33 against which the workholder 40 may be positioned by the operator and arranged these lugs so that each workholder will have a definite relation to the other workholders. As shown, the workholders are spaced equidistant from each other. However, I contemplate the use of unequal spacing of the workholders to increase the possible number of different patterns before repetition.

To further increase the number of different patterns obtainable, I move the workholder trays 40 transversely of the direction of travel of the conveyor 30. As shown in Figs. 2 to 6, each workholder tray is provided with a series of pads 120, which retain the work in position relative to the tray, the downwardly extending sides of the work embracing the sides of the pads. The workholders themselves are placed on the conveyor chain by the operator and when so positioned are free for transverse movements.

One form of mechanism for imparting a transverse movement to the workholders is illustrated in Figs. 3, and 4 and 5. As shown, a pan 150 is slidably mounted on a transverse bar 151 carried by the frame member and is provided with upstanding side walls 154 arranged to embrace the ends of the workholders. The forward portion (left hand in Fig. 3) of the walls 154 are bent outwardly as at 153, so that they will extend beyond the outer edges of the workholders and, when the conveyor is in operation, act to guide or cam the workholders into a predetermined position within the confines of the walls 154. The workholder guide 150 is reciprocated in a direction transverse to the movement of the conveyor. As shown in Figs. 2 and 4, pivotally secured to the guide at 165 is a crank arm 163, the end of which embraces an eccentrically mounted disk 164, carried by a vertical shaft 166. Rigidly secured to this shaft is a tooth wheel 161, having a plurality of arms 162 which extend into the path of the conveyor and of a series of lugs 170 carried by the conveyor chain 30 and which serve to rotate the eccentric disk 164. The lugs 170 are so spaced upon the chain that they will shift the guide 150 when the pattern is about to be duplicated, so that subsequent work will receive an impression in a different axial relation to the impression roll.

In the drawings there are eight arms 162 on the wheel 161. Hence, there will be four positions of the workholder. However, this is merely for purposes of illustration and it is readily apparent that the number of arms 162 may be increased to give more variation in transverse movement. The arrangement is such that the work, in passing through the rolls, between the compression rolls, will receive different patterns.

In Figs. 7 to 10 I diagrammatically illustrate the relative methods of obtaining the many variations in pattern. As heretofore mentioned, the periphery of the pattern roll is such that it is not a multiple of the units of work. For instance, if the work units are four inches square, and are spaced one inch apart, the total distance of dimensions of four spaced units placed in a row, would be 20 inches. Assuming that the circumference of the pattern roll is 21 inches, it would take five revolutions of the roll before its pattern would be duplicated. This would produce different patterns on the work carried by 20 workholders and if each workholder carried, for example, three pieces of work, there would be a total of 60 patterns. After five revolutions of this roll, or when the pattern would be duplicated for the first time, a lug 170 would strike the tooth 162 in the sprocket wheel 161 and rotate it a portion of a turn, which would shift the workholder, so that the work would lie in the relative position indicated in Fig. 8, that is, shifted to the right. The workholders would then pass between the impression rolls until the duplication would again be pressed, that is, twenty workholders would pass, at which time another lug on the chain would shift the workholder guide to a second position, which would shift the unit to the diagrammatic position shown in Fig. 9, and so on.

From the foregoing, it is readily apparent that a great number of varying designs could be had from the same pattern roll before duplication would result. The number of units on the workholders, and the number of workholders which receive an impression during one revolution of the pattern roll, as well as the number of transverse positions of the workholders, may be varied, as desired, without departing from the spirit of the invention. The specific numbers and distances described and illustrated have been used for ease of description, and simplicity of drawings.

When the two-color method is used, I use two machines similar to the one heretofore described, by interrupting the synchronism between the two machines, the number of different patterns then becoming substantially unlimited.

I claim:

1. A method of producing variable designs on tile or the like, comprising preparing a printing surface in the form of a plate or cylinder to carry the design to be reproduced, by providing a printing area many times larger than the face area of any of the individual tiles, and controlling the tonal variations throughout the entire printing area of said plate or cylinder to produce a plurality of areas throughout the entire printing area, each of which will have a complete tonal range and which areas relative to the tile areas are such that a plurality of tile may be decorated by one transfer taken from the major area, and each individual tile will have a fair degree of tonal variations in the design thus placed thereon and thereafter using such printing surface by transferring different portions of the major design of the plate or cylinder to individual tiles, whereby a large number of tiles bearing different designs but of the same general tonal variations may be produced from the same plate or cylinder.

2. A method of producing variable designs on tile or the like, comprising preparing two printing surfaces in the form of plates or cylinders by providing a printing area on each plate or cylinder many times larger than the area of any of the individual tiles, and controlling the tonal variations throughout the entire printing area of said plates or cylinders to produce areas throughout the entire printing areas thereof which will have a complete tonal range and which areas relative to the tile areas are such that a plurality of tile may be decorated by one transfer taken from the major area of the plates or cylinders, and each individual tile will have a fair degree of tonal variation, thereafter using such printing surfaces successively by transferring different portions of the major designs of each of the plates or cylinders to individual tiles successively while using a different colored ink on each plate or cylinder, whereby a large number of tiles bearing different designs in two major colors but of the same general tonal variations may be produced from the same plates or cylinders.

3. A method of producing variable designs on tiles, or the like, comprising preparing a printing plate or roll carrying the design to be reproduced, said printing plate or roll having an area many times larger than the area of the individual tiles, the design of said printing plate varying throughout the area thereof, and thereafter transferring different portions of the design of said plate to individual tiles, whereby a large number of tiles, bearing different designs, may be produced from the same plate or roll.

4. The method, according to claim 3, characterized that the positions of the transfers made from the printing plate or roll are progressively varied in a direction longitudinally of the plate.

5. The method, according to claim 3, characterized in that the positions of the transfers made from the printing plate or roll are progressively varied in a direction transversely of the plate.

6. The method, according to claim 3, characterized by the fact that the positions of the various transfers made from the printing plate or roll are varied in directions both longitudinally and transversely of the plate or roll.

7. A method according to claim 3, characterized by the fact that a second transfer of a design is applied over the first transfer, the second transfer also being variable in order to produce a still greater number of tiles bearing different designs.

8. A method of producing variable designs on tiles or the like, comprising preparing a printing plate or roll carrying designs to be reproduced, said printing plate or roll having an area many times larger than the area of the indiviual tiles, the design of said printing plate varying throughout the area thereof, and thereafter transferring different portions of the design of said plate to individual tiles, progressively varying the positions of the different transfers from the plate and progressively varying the shade or color of the pigment employed in making transfers, whereby a large number of tiles bearing different designs and having graduated colors can be produced from the same plate or roll.

LLOYD V. CASTO.